United States Patent [19]

Mountz et al.

[11] 4,403,804
[45] Sep. 13, 1983

[54] TRUCK OR TRAILER BODY CONSTRUCTION

[75] Inventors: Elton Mountz, Morgantown; Paul Whiteman, East Earl; Roy C. Higginson, Honeybrook; Marlin W. Hacker, Glenmoore, all of Pa.

[73] Assignee: Morgan Trailer Mfg. Co., Morgantown, Pa.

[21] Appl. No.: 367,401

[22] Filed: Apr. 12, 1982

[51] Int. Cl.³ .............................................. B62D 33/00
[52] U.S. Cl. ...................................... 296/183; 296/15; 296/29
[58] Field of Search .................... 296/29, 30, 1 R, 1 S, 296/181, 183; 105/401, 409, 422

[56] References Cited

U.S. PATENT DOCUMENTS

| | | | |
|---|---|---|---|
| 2,489,670 | 11/1949 | Powell, Jr. | 296/183 |
| 2,578,052 | 12/1951 | Evanoff et al. | 296/183 |
| 2,587,754 | 3/1952 | Osborn | 205/422 |
| 3,692,349 | 9/1972 | Ehrlich | 296/181 |
| 3,834,575 | 9/1974 | Carr | 296/183 |
| 4,222,606 | 9/1980 | Brown et al. | 296/183 |

Primary Examiner—Richard A. Bertsch
Attorney, Agent, or Firm—Z. T. Wobensmith, 2nd; Z. T. Wobensmith, III

[57] ABSTRACT

A truck or trailer body construction is disclosed in which the front portion is shaped to reduce dynamic drag, which has a maximum interior capacity, and in which the front corners, which are particularly subject to damage, can be readily replaced. Provisions are also made for diagonally mounted lights and for relief of air pressure at the upper part of the front corners.

6 Claims, 9 Drawing Figures

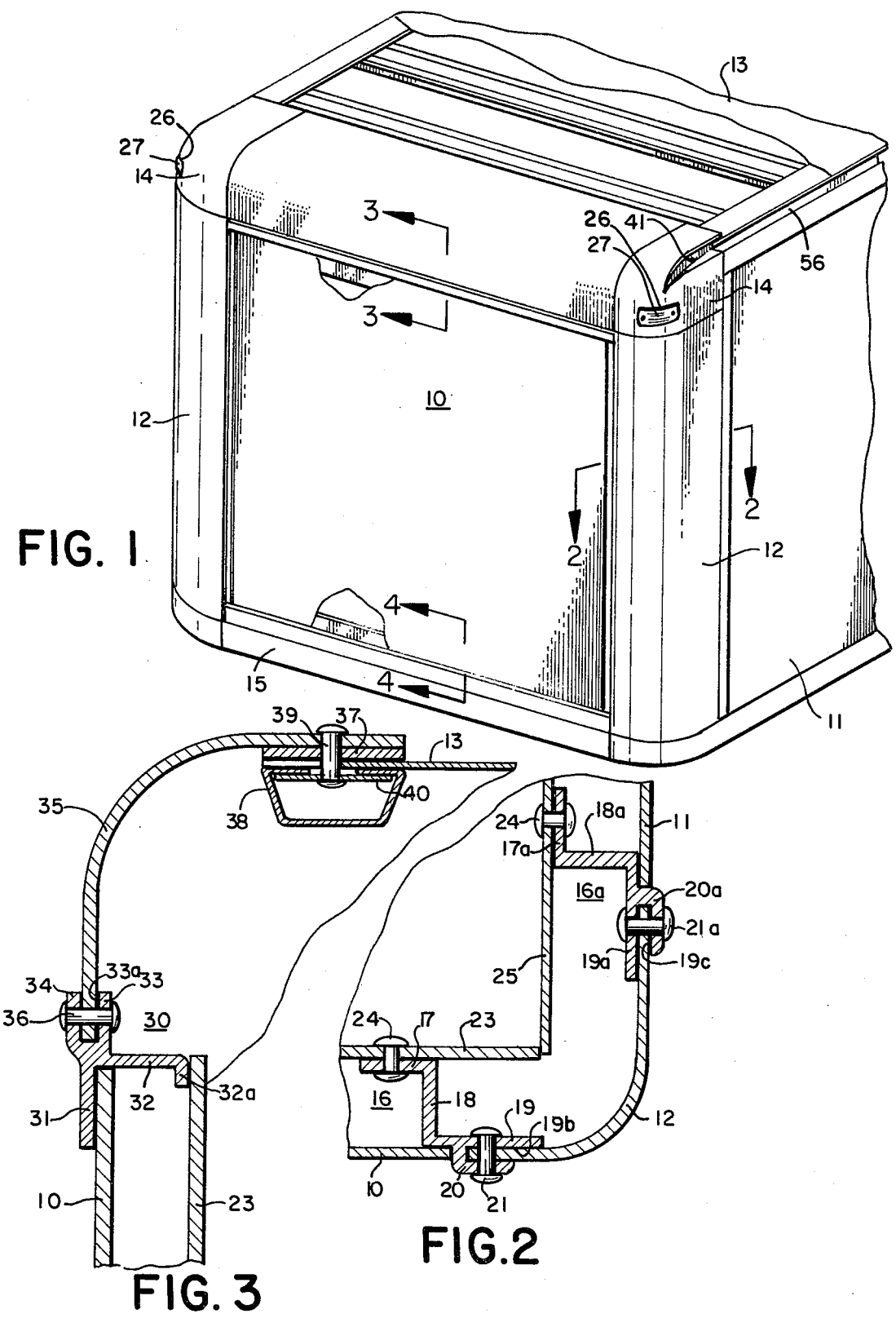

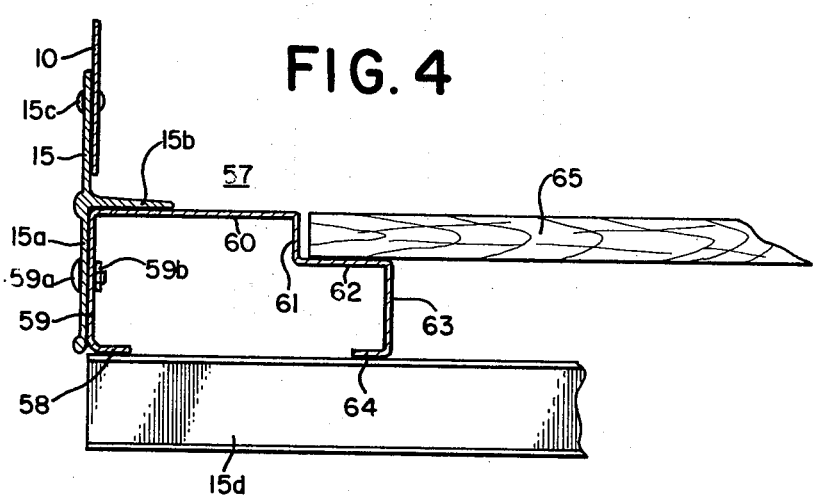
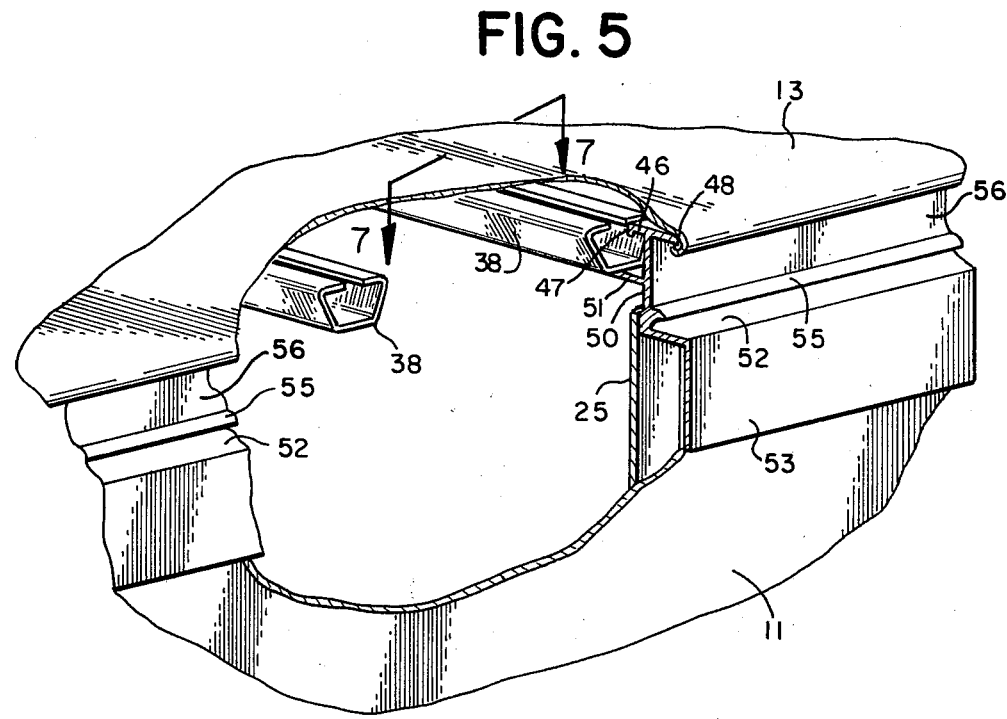
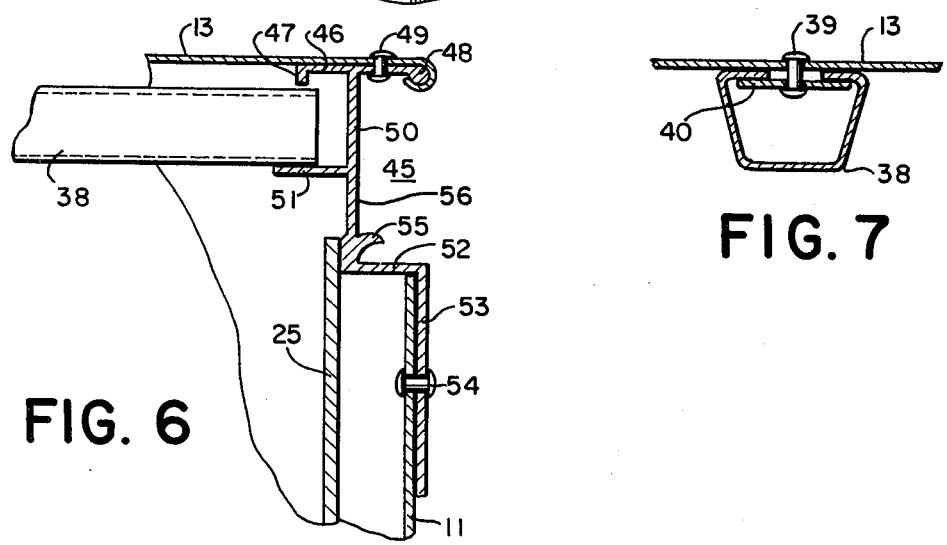

TRUCK OR TRAILER BODY CONSTRUCTION

BACKGROUND OF THE INVENTION

1. Field of the Invention

This invention relates to a front end of a truck or trailer body.

2. Brief Description of the Prior Art

Various provisions have heretofore been proposed to reduce the dynamic drag of the body.

This has included rounding the front end as in the U.S. Patents to FOSTER, No. 2,322,841; THERIAULT, No. 2,441,106; RIDGEWAY, No. 2,621,059; GREENE, No. 4,206,715; and WILSON, No. 2,471,917, but this results in loss of space in the interior.

It has also been proposed to round the front corners of the body as shown in the U.S. Patents to POWELL, No. 2,489,670; TORSETH, No. 2,600,146; BROWN, No. 4,222,606, and CRAVENS HOMALLOY, German Pat. No. 25 02 383, but the corner constructions are not readily removable.

POWELL, in U.S. Pat. No. 2,489,670, shows a body for wheeled vehicles which, as shown in FIG. 9, taken on line 9—9 of FIG. 2, has a vertical corner construction with a base frame 5, panels 1 and 2 between which the corner construction is interposed with bolts 15 holding the panels and the corner construction in assembled relation. The outer cover sheet 16 (FIG. 9) is arcuate, extends across the edges of each of the panels 1 and 2, and has portions 20X concentric with the cover sheet 16 and curved plates 20xx. In order to change the sheet 16, if it were damaged, it would be necessary to remove the bolts 15 which would essentially require disassembly of the panels 1 and 2.

TORSETH, in U.S. Pat. No. 2,600,140, shows a commercial truck body which is very similar in its joining of a side panel to a roof panel to the structure of POWELL.

BROWN, in U.S. Pat. No. 4,222,606, shows a truck body and in FIG. 3, has a rear vertical corner construction for joining a rear side panel 11 and an end panel 65. Removal of the corner extrusion 51 for replacement and into which the panels 11 and 65 are received would be virtually impossible.

CREVENS HORMALLY, in German Pat. No. 25 02 383, shows a vertical corner extrusion 14 in which the side panel 10 and the front panel 12 are received and secured. Removal of the corner extrusion 14 would be virtually impossible.

None of the prior art patents referred to above show a readily removable corner post construction for easy replacement in the event of damage, nor of diagonally disposed front lights, nor for relief of air pressure at the upper part of the front wall, nor for a light weight lower front end construction.

SUMMARY OF THE INVENTION

In accordance with the invention, a front construction for a truck or trailer body is provided which has a reduced dynamic drag, which has diagonally disposed recessed front lights, which has provision for relief of air pressure at the upper part of the front wall, which has a light weight lower front end construction, and which has a readily removable and replaceable corner contstuction. Additional space is also made available within the interior of the body.

It is the principal object of the invention to provide a front construction for a truck or trailer which has a reduced dynamic drag.

It is a further object of the invention to provide, in a truck or trailer body, a front construction with recessed diagonal lights.

It is a further object of the invention to provide, in a truck or trailer body, a light weight lower front end construction.

It is a further object of the invention to provide, in a truck or trailer body, a readily removable corner for easy replacement.

It is a further object of the invention to provide in a structure of the character aforesaid for additional interior space.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 1 is a view in perspective of the front of a trailer or the like;

FIG. 2 is a fragmentary horizontal sectional view, taken approximately on the line 2—2 of FIG. 1;

FIG. 3 is a fragmentary vertical sectional view, taken approximately in the line 3—3 of FIG. 1.

FIG. 4 is a fragmentary vertical sectional view, taken approximately on the line 4—4 of FIG. 1;

FIG. 5 is a perspective view of a portion of the side of the trailer, parts being broken away to show the interior construction;

FIG. 6 is a vertical sectional view taken approximately on the line 6—6 of FIG. 5;

FIG. 7 is a vertical sectional view taken approximately on the line 7—7 of FIG. 5;

FIG. 8 is a fragmentary side elevational view of the front portion of a trailer or the like.

Figure 8:
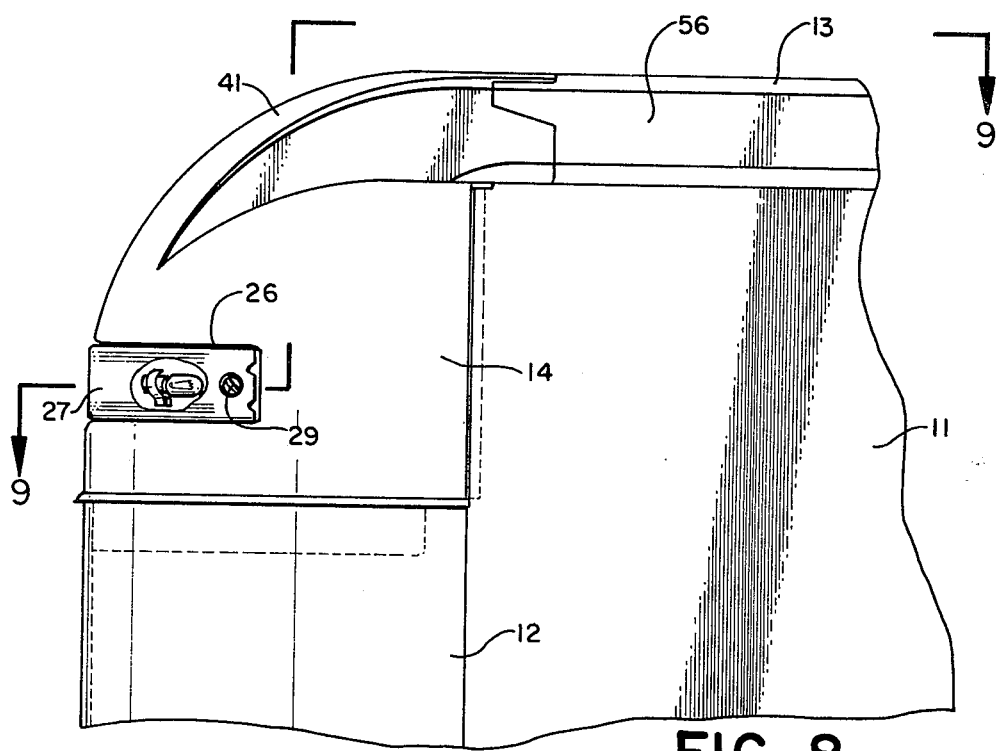
Figure 9:
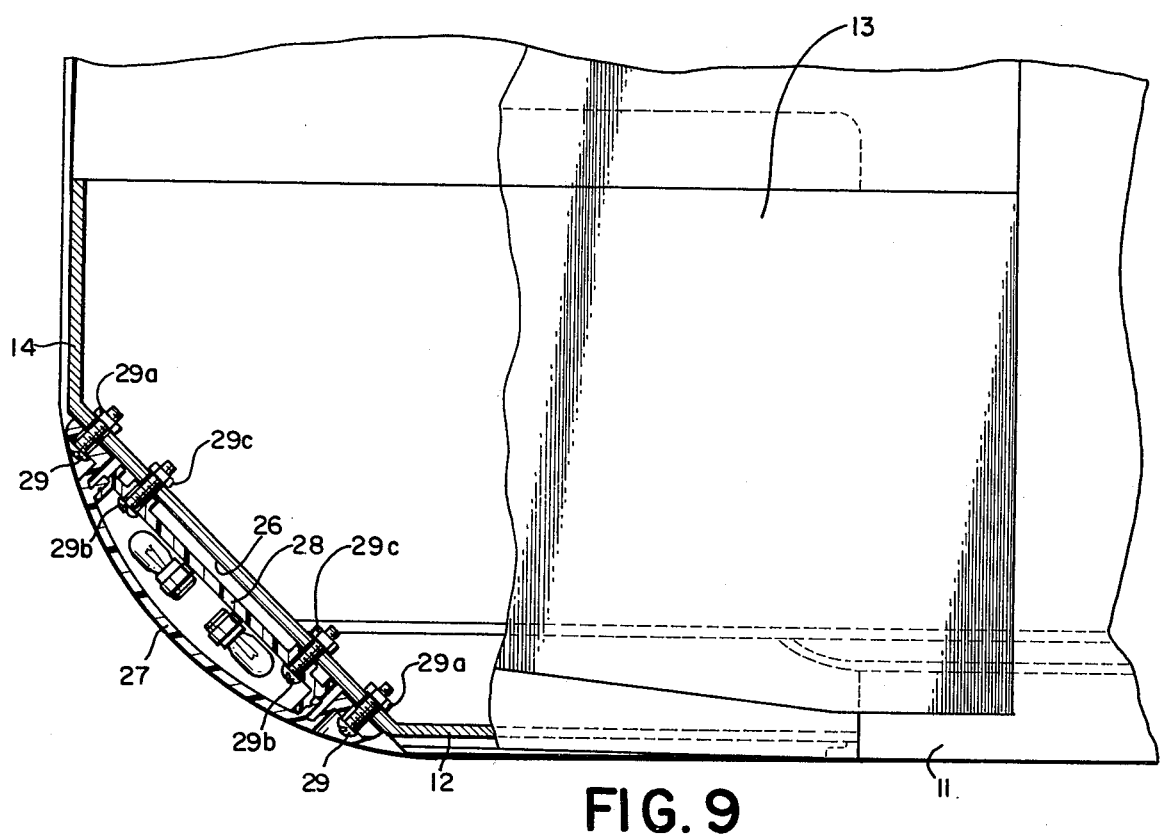
FIG. 9 is a sectional view taken approximately on the line 9—9 of FIG. 8.

It should, of course, be understood that the description and drawings herein are illustrative merely and that various modifications and changes can be made in the structure disclosed without department from the spirit of the invention.

Like numerals refer to like parts throughout the several views.

DESCRIPTION OF THE PREFERRED EMBODIMENT

Referring now more particularly to the drawings, the front portion of a trailer is shown in FIG. 1, and includes an outer front and central panel 10, an outer side panel 11, outer curved corner plates 12, a roof portion 13, cast corner sections 14 and a lower front transverse plate 15. The cast corner sections 14 have a diagonal channel 26 formed therein for the reception of a diagonal light cover 27, preferably amber colored, detachably secured in place and in covering relation to a light 28 by screws 29 and nuts 29a. The light 28 is secured in place by screws 29b and nuts 29c.

A channel 41 is provided in each of the case corner sections 14 for relief of air pressure at that location. The plate 15 has a vertical portion 15a, a horizontal portion 15b intermediate the upper and lower extremities of the vertical portion 15a, and a line of horizontal rivets 15c for securing the front panel 10 in place. Rearwardly at the plate 15 and supported on one of the conventional longitudinal beams 15d of the floor, a sheet metal support 57 is provided.

The support 57 has a lower horizontal flange 58, with a vertical flange 59 extending upwardly therefrom, the flange 59 being secured to the plate portion 15a by bolts 59a and nuts 59b. The support 57 has a rearwardly extending horizontal flange 60 located beneath the horizontal portion 15b with a vertical flange 61 connected thereto and a horizontal flange 62 connected to the flange 61. The flange 62 has a vertically extending flange 63 extending downwardly therefrom with a forwardly extending flange 64 supported by and secured to longitudinal beams 15b in a conventional manner. The flange 62 serves as a support for rearwardly disposed wood plank floor boards 65.

Referring now to FIG. 2, an extrusion 16 is provided and is vertically disposed and divided at the top and bottom. The extrusion 16 has a flange 17, a longitudinally disposed cross piece 18 and a flange 19 parallel to the flange 17, but extending in the opposite direction from the cross piece 18.

The flange 19 has a hooked portion 20 for the reception of one vertical edge of a curved corner plate 12 which is secured to the flange 19 and in engagement with the hooked portion 20 and disposed in a socket 19b by a plurality of vertically spaced rivets 21.

An extrusion 16a similar to the extrusion 16 is also provided with its flange 17a forwardly disposed, with its cross piece 18a transversely disposed, with a flange 19a, a hooked portion 20a for the reception of the other vertical edge of the corner plate 12, which is secured to the flange 19a and in engagement with the hooked portion 20a and disposed in a socket 19" by a plurality of vertically spaced rivets 21a.

The flange 17 has secured thereto by vertically spaced rivets 22 the interior front wall 23. The flange 17a has secured thereto by vertically spaced rivets 24 the interior side wall 25.

The radius of curvature of the outer corner plate 12 can be selected as desired, but a radius of five inches has been found suitable.

It will be understood that the structure as heretofore described is also employed at the left hand side of the front portion.

Referring now to FIG. 3 of the drawings, the construction of the upper part of the front section is there illustrated and includes an extrusion 30 which has a downwardly extending exterior flange 31 with a transversely extending portion 32 having a downturned end 32a. An upwardly extending flange 33 is also provided together with a hooked portion 34 having therebetween a socket 33a for engagement of a curved section 35 which is held to the flange 33 and in engagement with the hooked portion 34 by spaced horizontal rivets 36. The curved section 35 can have any desired radius, but a radius of nine inches has been found to be suitable.

The upper end of the curved section 35 has interposed therebelow a strip 37, preferably of waterproof material with the roof portion 13 therebelow. The upper end of the curved section 35 is supported by a roof rafter 38, supported as hereinafter pointed out by the frame of the trailer or the like and is held by a horizontal line of rivets 39 which also engage a longitudinal strip 40 carried in the roof rafter 38.

Referring now to FIGS. 5 and 6, an extrusion 45 is provided along the side at the top of outer side panel 11 and interior side wall 25. The extrusion 45 has an upper horizontal flange portion 46 with a downturned flange 47 at the inner side to engage the roof rafters 38 and for connection thereto and a portion 48 circular in cross section at the outer side around which the roof portion 13 extends with horizontal spaced rivets 49 to secure the roof portion 13 to the horizontal portion 46. A vertical portion 50 extends downwardly from the flange portion 49 and has an inwardly extending flange 51 in supporting relation to the roof rafter 38 and for connection thereto.

At the lower end of the vertical portion 50 a horizontal portion 52 is provided from which a vertical flange 53 extends to which the outer side panel 11 is interiorly secured by a line of horizontal rivets 54. The interior side wall 25 is secured to the lower end of the vertical portion 50. At the junction of the vertical portion 50 is the horizontal portion 52, a hooked portion 55 is provided to aid in shedding rain water or the like along the extrusion 45. A rearwardly extending channel 56, bounded by the outer portion of the flange 46, the vertical portion 50, and the horizontal portion 52 is in alignment with and in communication with the channel 41 in the casting 14.

Referring now to FIG. 7, the roof portion 13 is held to the roof rafter 38 by a line of vertical rivets 39 extending through the strip 40.

When it is desired to replace either of the curved corner plates 12 because of damage thereto, the heads of the rivets 21 are removed and the plate 12 to be replaced is removed from the sockets 19c and 19d. A new plate 12 is inserted in engagement in the sockets 19c and 19d and with the hooked portions 20 or 20a and new rivets 21 are inserted.

It will be seen that easy removability and reinsertion of the curved corner plates 12 is available and that the interior space within the body by reason of the mounting of the front wall 23 and the interior side wall 25 is increased.

The light cover 27 and light 29 are also readily accessible for replacement of the light 28 if required.

We claim:

1. A front portion for a truck or trailer body for reducing dynamic drag which comprises
   an outer central panel section,
   outer curved corner plates along the vertical sides of the panel section,
   outer side panels extending rearwardly from said corner plates,
   a roof section,
   an upper curved plate extending from the central plate section to the roof section, and
   means including a plurality of supporting members interposed between said outer central panel and said side panels for supporting said corner plates,
   said last means comprising vertical supporting members having sockets for the reception for marginal edges of said curved plates.

2. The combination defined in claim 1 in which
   said curved corner plates are removably mounted in said sockets.

3. The combination defined in claim 2 in which
   rivets are provided for retaining marginal edges of said corner plates in said sockets.

4. The combination defined in claim 1 in which
   means is provided in said roof section for supporting said roof section.

5. The combination defined in claim 1 in which
   an interior front wall is provided supported by at least one of said supporting members.

6. The combination defined in claim 1 in which
   an interior side wall is provided supported by at least one of said supporting members.

* * * * *

UNITED STATES PATENT AND TRADEMARK OFFICE
CERTIFICATE OF CORRECTION

PATENT NO. : 4,403,804
DATED : September 13, 1983
INVENTOR(S) : ELTON E. MOUNTZ et al.

It is certified that error appears in the above-identified patent and that said Letters Patent is hereby corrected as shown below:

Column 2,

Line 64, after "the", "case" should be - cast -

Signed and Sealed this

Fifteenth Day of November 1983

[SEAL]

Attest:

GERALD J. MOSSINGHOFF

Attesting Officer  Commissioner of Patents and Trademarks